Feb. 12, 1963 C. GERST 3,077,116
POWER TRANSMISSION
Filed Jan. 30, 1961 5 Sheets-Sheet 4
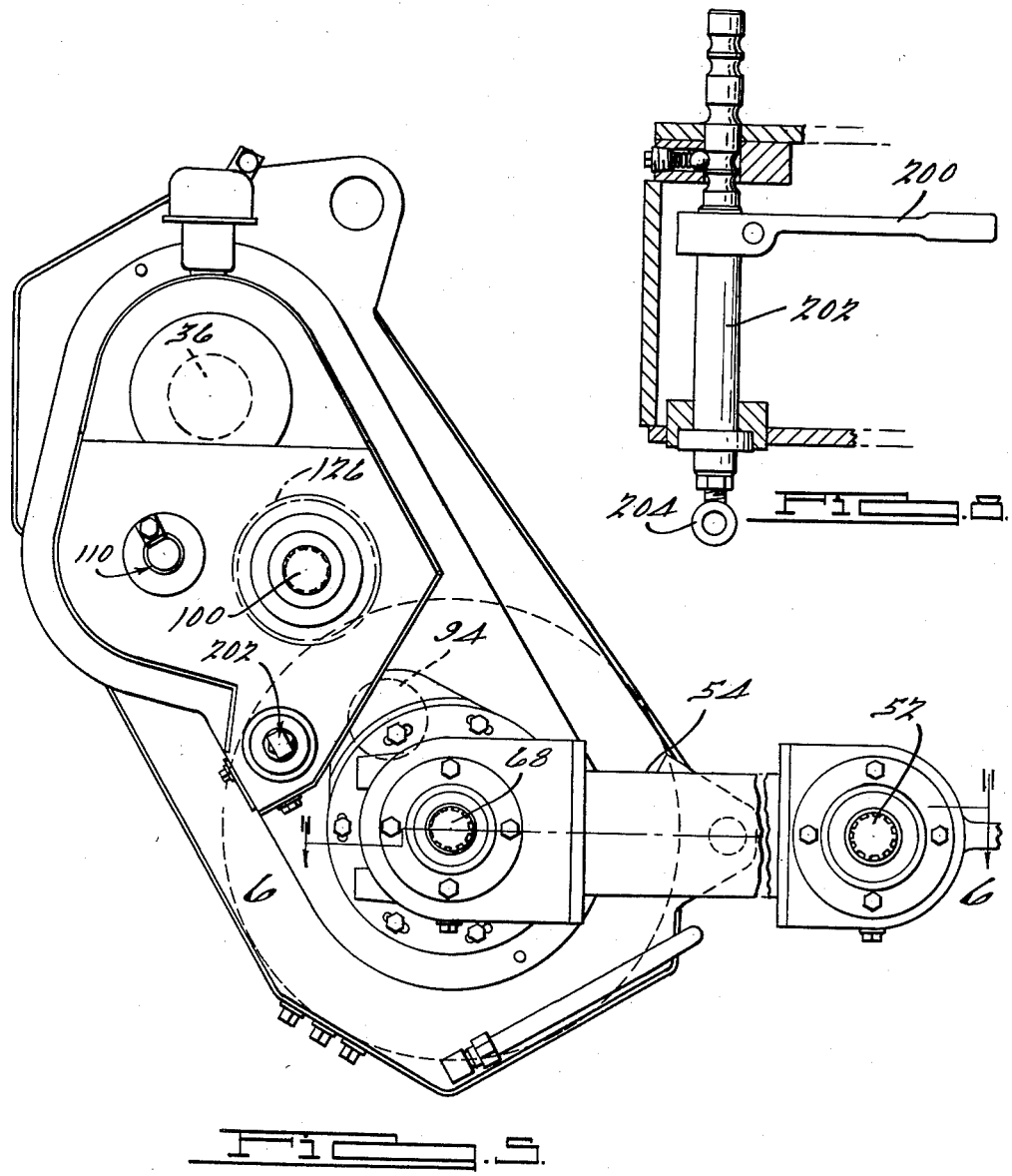
INVENTOR.
Chris Gerst.
BY
Balluff and McKinley
ATTORNEYS.

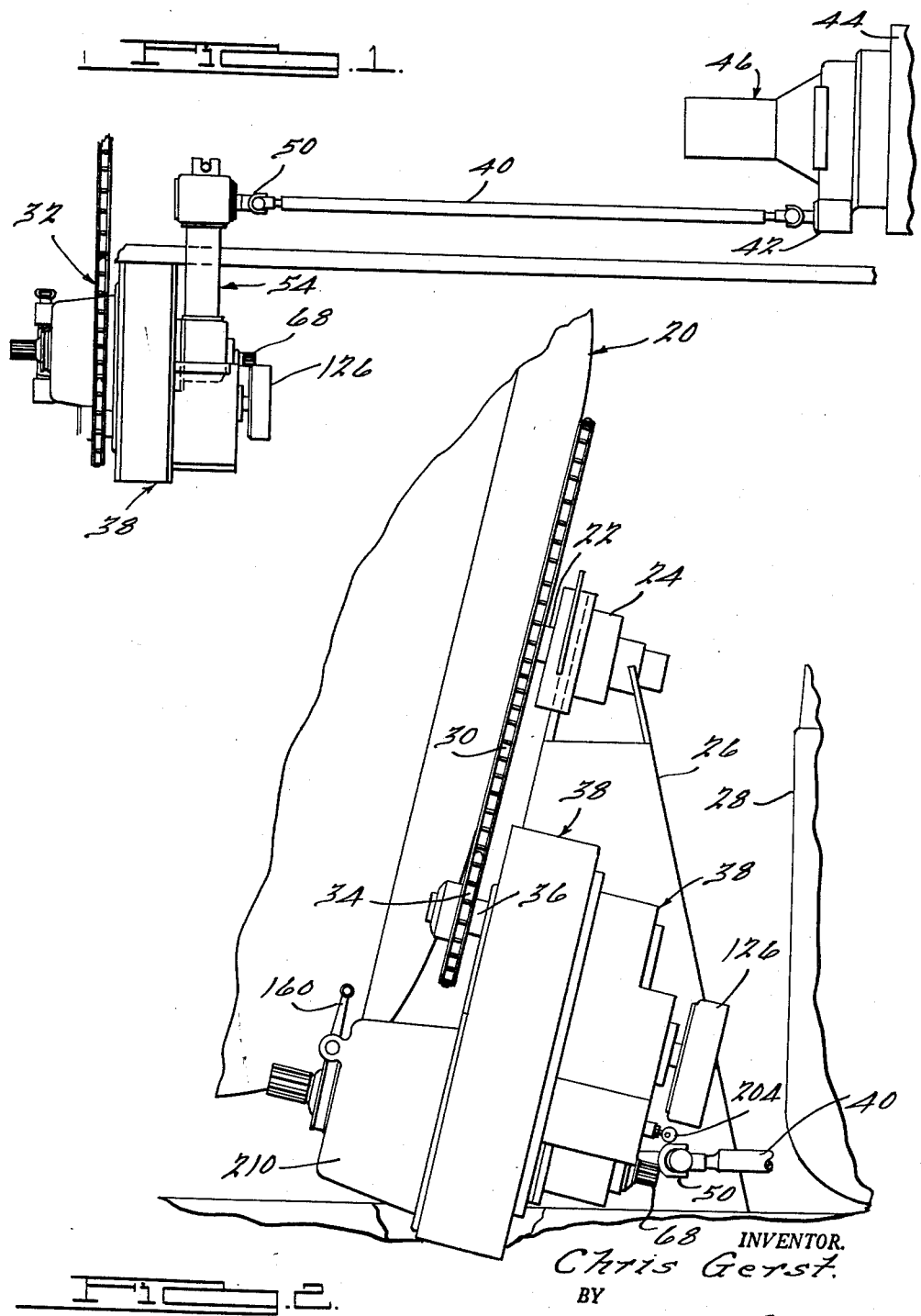

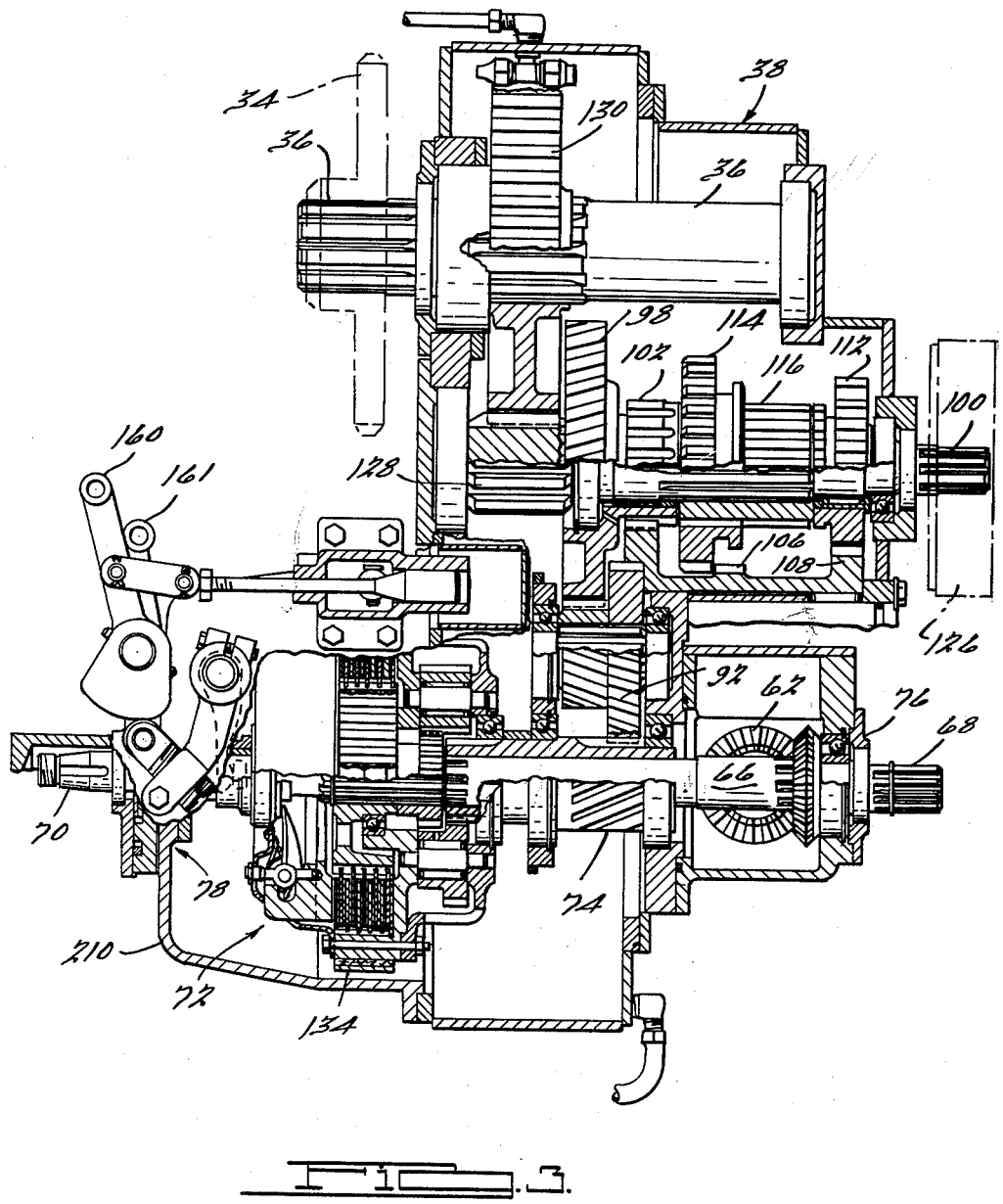

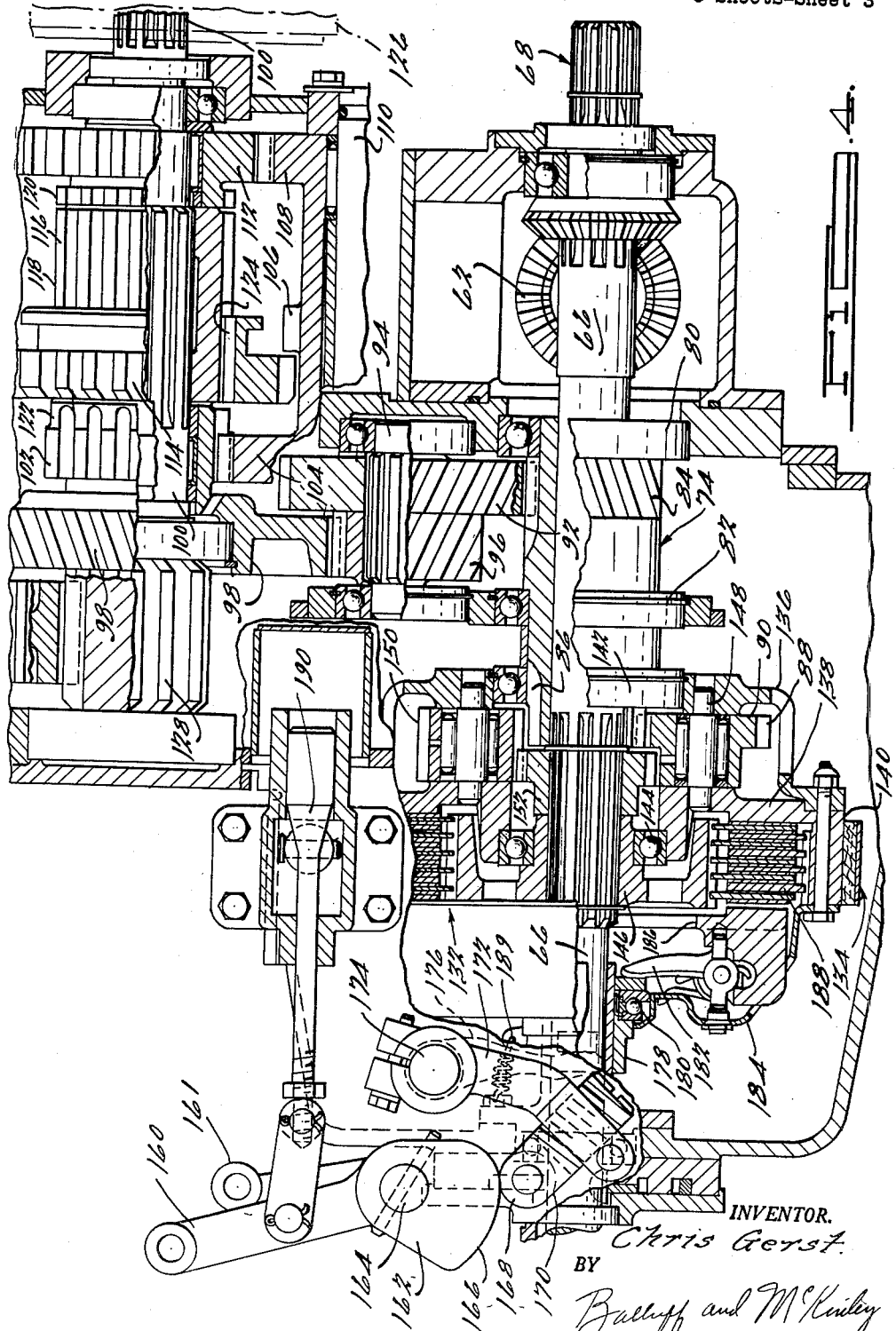

Feb. 12, 1963   C. GERST   3,077,116
POWER TRANSMISSION
Filed Jan. 30, 1961   5 Sheets-Sheet 5

INVENTOR.
Chris Gerst.
BY
Balluff and McKinley
ATTORNEYS

United States Patent Office 3,077,116
Patented Feb. 12, 1963

3,077,116
POWER TRANSMISSION
Chris Gerst, Detroit, Mich., assignor, by mesne assignments, to Dana Corporation, a corporation of Virginia
Filed Jan. 30, 1961, Ser. No. 85,571
7 Claims. (Cl. 74—15.86)

This invention relates to power transmissions and has particular reference to a transmission unit adapted to be mounted on a truck for driving a cement mixer mounted thereon. As illustrated, the transmission provides three speeds in both forward and reverse.

In truck-mounted cement mixers the mixer drum may be driven from the truck engine as shown, for example, in my prior Patent No. 2,680,377, issued June 8, 1954, or driven from a separate engine as shown, for example, in my prior Patent No. 2,669,131, issued February 16, 1954. Where the mixer is driven from the truck engine various power take-offs are employed for driving the mixer, in some cases the power take-off being at the front of the engine, in other cases the power take-off being of the flywheel type, and in still other cases the power take-off being built into the transmission unit in the driving system of the truck. Where separate engines are employed, the engines in some cases are mounted at the rear of the truck and in other cases transversely of the truck in the space behind the truck cab or at the front of the mixer. The power transmission of the present invention is constructed so that it may be used with a separate engine or connected to a power take-off from the truck engine for driving the mixer drum, and is so designed that it lends itself to use with the various drive arrangements hereinbefore referred to. In addition, the three speeds in both forward and reverse, coupled with the substantial differences in the gear ratios between the various speeds, make it possible to drive the mixer drum so as to meet a wide variety of conditions and problems encountered in the use of truckmounted mixers.

A principal object of the invention is to provide a new and improved power transmission unit which is particularly adapted for driving a truck-mounted cement mixer.

Another object of the invention is to provide such a transmission which is readily adapted to be driven from the engine of the vehicle or from a separate engine mounted on the vehicle.

Another object of the invention is to provide a low-cost, dependable, efficient transmission unit which is particularly adapted for driving truck-mounted cement mixers.

Other and further objects of the invention will be apparent from the following description and claims and may be understood by reference to the accompanying drawings, of which there are five sheets, which by way of illustration show a preferred embodiment of the invention and what I now consider to be the best mode of applying the principles thereof. Other embodiments of the invention may be used without departing from the scope of the present invention as set forth in the appended claims.

In the drawings:

FIGURE 1 is a fragmentary view of the chassis of a truck-mounted cement mixer provided with a power transmission embodying the invention hooked up through a flywheel drive type of power take-off whereby the mixer may be driven from the truck engine;

FIGURE 2 is an enlarged fragmentary side elevational view showing the power transmission and the power train to the mixer drum;

FIGURE 3 is an enlarged longitudinal sectional view of the transmission;

FIGURE 4 is an enlarged fragmentary sectional view of the input side and the forward and reverse driving mechanism of the power transmission;

FIGURE 5 is an end elevational view of the transmission;

FIGURE 8 is a view showing the shifter arrangement which controls the three-speed drive mechanism of the transmission.

Figure 6:
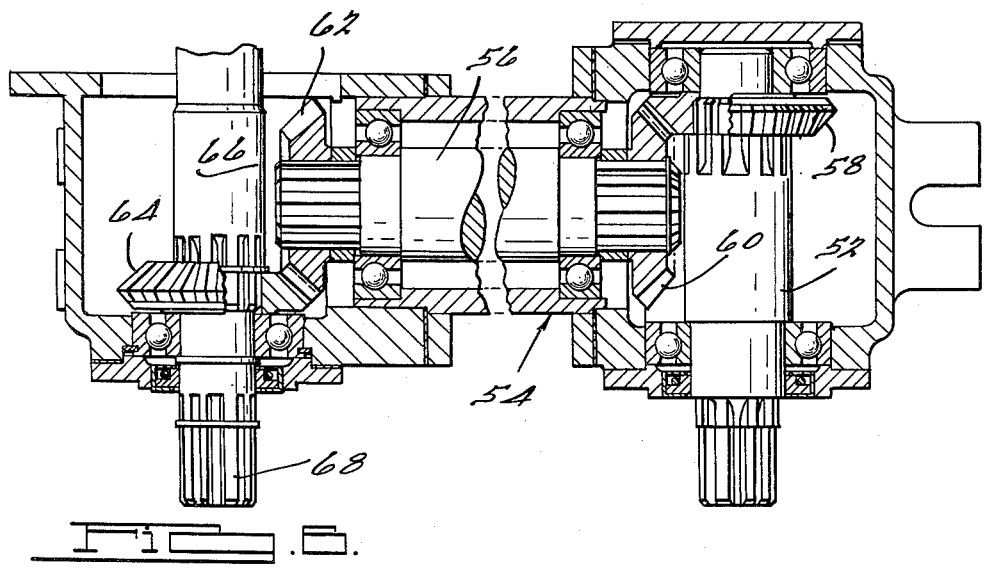
FIGURE 6 is an enlarged fragmentary sectional view of the transfer section taken along the line 6—6 of FIGURE 5.
Figure 7:
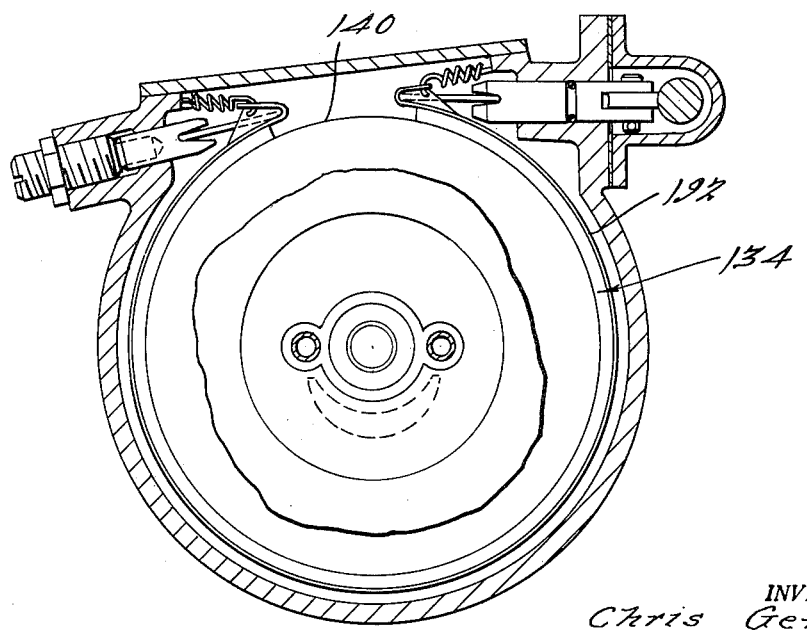
FIGURE 7 is a cross-sectional view of the brake which forms a part of the forward and reverse mechanism of the transmission.

As shown in FIGURES 1 and 2, the rotary drum 20 of the mixer is rotatably supported at its forward end on a shaft or trunnion 22 journaled in a bearing 24 which, in turn, is carried by a bracket 26 mounted on the chassis at the back end of the truck cab 28. A sprocket 30 fixed to the drum 20 is driven by the endless chain 32 from a drive sprocket 34 which is fixed to the output shaft 36 of the power transmission 38. The power transmission unit 38 as shown is connected by a propeller shaft 40 with a flywheel power take-off indicated generally at 42 whereby the mixer drum may be driven from the truck engine 44 through the power take-off 42, the propeller shaft 40, the power transmission 38, the sprocket 34, the chain 32, and the sprocket 30 which is fixed to the drum 20 for rotating the same.

The flywheel power take-off 42 is drivingly connected to the engine crankshaft ahead of the transmission and clutch indicated generally at 46 of the drive system of the vehicle between the engine and the road wheels thereof, thus making it possible to drive the mixer independently of the truck. However, my new and improved power transmission unit may, as previously indicated, be coupled with any suitable power take-off and is particularly adapted for use with those power take-offs conventionally employed for truck-mounted mixers, as well as with separate truck-mounted engines.

With the drive arrangement as illustrated in FIGURES 1 and 2, the propeller shaft 40 is coupled through a universal joint 50 with a shaft 52 of a power transfer section or unit indicated generally at 54. The unit 54 includes a suitable housing in which shafts 52 and 56 are journaled, such shafts being drivingly connected by bevel gears 58 and 60. A bevel gear 62 fixed on the other end of the shaft 56 drives bevel gear 64 fixed to the input shaft 66 of the power transmission 38. In some cases, such as when the power takeoff is at the front of the engine, it may be possible to couple the drive shaft therefrom directly to the projecting end 68 of the input shaft 66, in which event the transfer unit may be omitted. Thus the transfer unit need be used only when the power take-off is such that the propeller shaft may not be connected directly to the input shaft 66. It will be noted, however, that the transfer unit 54 makes it possible to connect a drive shaft to the power transmission 38 where the axis of the drive shaft is so far out of line with the axis of the shaft 66 that the misalignment cannot be handled through a universal joint.

In some of the figures of the drawings, such as FIGURES 3, 4, 5 and 6, the end 68 of the input shaft 66 projects forwardly from the transmission housing. It will be understood that this end is covered by a suitable cap when the driving arrangement as illustrated is used unless it is desired to use such end 68 of the shaft as a power take-off for driving some other piece of equipment. In FIGURE 3 the other end 70 of the shaft 66 is also shown projecting rearwardly from the transmission. When the transmission 38 is used in other arrangements, such as with a truck-mounted engine where the engine is mounted on the truck chassis at the rear thereof, the output shaft of the engine may be suitably coupled to the end 70 of the input shaft 66, in which event, of course, the transfer unit 54 would not be used. In the arrangement as illustrated the projecting end 70 of the shaft 66 may be used as a power take-off if desired. In any event, the input shaft 66 is unidirectionally driven from a suitable source of power.

The transmission 38 includes a forward and reverse mechanism or section indicated generally at 72 which is operatively associated with the shaft 66 whereby an outer shaft 74 may be coupled with the shaft 66 for rotation therewith in the same direction or in the opposite direction. In the neutral position of the forward and reverse mechanism 72 the drive between the shafts 66 and 74 is interrupted. The shaft 66 is journaled in bearings 76 and 78 mounted in the transmission housing wall adjacent the points where the shaft projects from the transmission housing. The outer shaft 74 surrounds the shaft 66 for a portion of its length and is journaled in bearings 80 and 82. One end of the shaft 74 is formed to provide a gear 84 and the other end is formed to provide a gear 86. Thus the shaft 74 may be considered as a double gear. Gear 86 is positioned so that its teeth mesh with the teeth 88 of a set of three planet gears 90. The teeth of the gear 84 are in constant mesh with the teeth of a gear 92 which is splined to a shaft 94. Also splined to the shaft 94 is a gear 96, the teeth of which are in constant mesh with the teeth of the gear 98 which is journaled on brake and clutch shaft 100. The gear 98 is integral with a gear 102, the teeth of which mesh with the teeth of gear 104. Gear 104 is one gear of a cluster which includes gears 106 and 108, the hub of which is journaled on axle 110. Thus the shaft 74 is continuously geared through gears 84 and 92, shaft 94, and gears 96, 98 and 102 with the gear cluster 104, 106, 108. The teeth of gear 108 are in constant mesh with the teeth of gear 112 journaled on shaft 100.

A sliding gear and clutch 114 is slidably splined on a sleeve 116 which is splined to the shaft 100 for rotation therewith. The external splines 118 of the sleeve 116 form clutch teeth. The gear 112 is provided with a set of clutch teeth 120, and the gear 102 is provided with a set of clutch teeth 122. In the position of the parts as shown in FIGURE 4, there is no drive between the gear cluster 104, 106, 108 and the shaft 100. The internal splines or teeth 124 of the gear 114, which are slidably meshed with the splines 118 of the sleeve 116, are adapted when the gear 114 is shifted to the left to mesh with the clutch teeth 122 so as to couple the shaft 100 to the gear 102 for rotation therewith. When the gear 114 is shifted to the right from the position shown so as to mesh the external teeth of gear 114 with the teeth of gear 106, the shaft 100 will then to drivingly coupled with the cluster gear through the sleeve 116 and the gear 114. By shifting the gear 114 further to the right so as to engage the splines 124 thereof with the clutch teeth 120, the shaft 100 will be coupled with the gear 112 for rotation therewith. Thus by selectively shifting the gear 114, three different speed ratios may be provided in the drive between the gear 98 and the shaft 100.

The shaft 100 projects from the transmission where it is provided with a brake 126 whereby the shaft 100 and the parts drivingly connected therewith may be held against rotation when desired. The brake 126 is a conventional band brake which may be either mechanically or hydraulically applied and is normally released. The other end of the shaft 100 is provided with teeth to form a gear 128 which mesh with the teeth of a gear 130 which is fixed to the output shaft 36.

The forward and reverse mechanism 72 of the transmission includes a multiple disc clutch indicated generally at 132, a brake 134, and a planetary gear drive arrangement which includes the set of three planet gears 90. The set of planet gears 90 comprises three equally spaced gears 90 carried by planet carrier 136, 138. The outer periphery 140 of the clutch driven part 138 forms the brake drum of the brake 134. The planet carrier 136, 138 is integrated and journaled on bearings 142 and 144, bearing 142 being mounted on the shaft 74 while bearing 144 is mounted on the hub of the driving member 146 of the clutch which is splined to the shaft 66. Each of the planet gears 90 is journaled on a shaft 148 carried by the planet carrier 136, 138. In addition to the set of three gears 90, there is also a set of three planet gears 150 carried by the planet carrier, the gears 150 being equally spaced. The gears 150 are each in mesh with the teeth of a gear 90 and in addition with the teeth of a sun gear 152 which is splined to the shaft 66. In the neutral position of the forward and reverse mechanism when the clutch 132 is disengaged and the brake 134 released, the reaction provided by the gear 86 on the planet gears 90 will cause the planet gears to planetate when the shaft 66 is driven but there will be no drive between shafts 66 and 74. In the forward position when the clutch 132 is engaged so as to lock the driving and driven elements 138 and 146 of the clutch together, the planet carrier will be locked to the shaft 66 and the gears 150 cannot rotate about their own axes, whereby the shaft 74 will be coupled with the shaft 66 for rotation therewith in the same direction. However, in the reverse position when the clutch 132 is disengaged and the brake 134 applied, the planet carrier 136, 138 will be held against rotation, whereupon the gear 152 will cause the gears 150 and 90 to rotate about their own axes, thus driving the gear 86 through the gears 150 and 90 in the opposite direction with respect to the shaft 66.

The clutch 132 is of the self-engaging type; that is, it includes springs (not shown) which react on the clutch plates so as to engage the same. The clutch shown is an automotive type clutch which is normally engaged in the sense that the springs of the clutch react on the clutch plates for locking the same together. However, as used in the arrangement here illustrated, the clutch is disengaged in neutral and also in the reverse position when the brake 134 is applied. The forward, neutral and reverse positions of the transmission are controlled by a manual shift lever 160 which is shown in its neutral position in FIGURE 4. The lever 160 includes a cam 162 which is pinned to a rock shaft 164. A lever 161 is also fixed to shaft 164 to permit power shifting. By shifting the lever 160 in a clockwise direction about its pivot provided by the rock shaft 164, the surface 166 of the cam 162 will move out of the path of the roller 168 carried by the adjustable arm 170 of lever 172 mounted on rock shaft 174, thus permitting lever 172 to swing clockwise and release the pressure exerted by arm 176 on the sleeve 178 which carries the clutch throw-out bearing 180, whereupon the clutch releasing fingers 182 are released and the clutch springs are free to engage the clutch. The clutch springs (not shown) are confined between the clutch cover 184 and the pressure plate 186 which bears against the stack of clutch discs 188 for clamping the same together and thereby engaging the clutch. A coil spring 189 reacting on sleeve 178 biases the same away from the ends of the clutch releasing fingers 182.

In the neutral position, as shown, of the forward and reverse mechanism, the clutch throw-out bearing 180 reacts on the clutch releasing fingers 182 so as to hold the clutch disengaged and this relationship prevails when the lever 160 is shifted counterclockwise to the reverse position due to the fact that the cam surface 166 to the left of the point of its engagement with the roller 168 is a true arc about the axis of the rock shaft 164. When the lever 160 is shifted to the reverse position a cam 190 is arranged to react on the band 192 of the brake 134 for contracting the same upon the drum 140; thereby to lock the drum 140 and the parts associated therewith, including the planet carrier 138, 136, against rotation. As previously noted, this causes the gears 90, 150 to rotate about their own axes and thus drive the shaft 74 in a reverse direction with respect to the shaft 66.

The planetary reversing mechanism 72 per se is like that disclosed in my prior Patent No. 2,724,290, issued November 22, 1955, for "Transmission and Axle Mechanism."

In the power transmission here illustrated the transmission will operate in forward about 90% of the time for mixing the materials in the drum 20, and will be operated in reverse when it is desired to discharge material from the drum. The neutral position of course interrupts the drive and permits the drum 20 to be stationary for loading and other purposes, including shifting between the various speeds provided by the three-speed arrangement. The reversing mechanism 72 provides a simple and efficient arrangement for smoothly shifting from forward to reverse and vice versa.

The gear 114 which is shiftable to select the desired speed ratio for the transmission is shifted by a fork 200 (FIGURE 8) carried by a shift rod 202, the end of which projects outwardly of the transmission housing where it is provided with an eye 204 by means of which it may be axially shifted so as to selectively shift the gear 114 to any one of its five positions, there being a neutral position for the gear 114 on each side of the gear 106.

The working parts of the transmission, including the gears, shafts, clutches, and bearings, are all suitably enclosed in a rugged housing which provides a support for the shaft bearings, and in addition contains lubricant for lubricating the working parts of the transmission. Provisions may be made by circulating the lubricant from one part of the transmission to another to insure adequate lubrication of all of the working parts of the transmission. The reverse mechanism 72 which includes the clutch 132 and the brake 134 is enclosed by a removable cover section 210 of the housing which provides convenient access to the reverse mechanism for service purposes.

The power transmission 38 provides in the forward gear a reduction of 24.1 to 1 in high gear; a reduction of 43.5 to 1 in second gear; and a reduction of 80.2 to 1 in low gear. In reverse the reduction in high gear is 20.6 to 1; in second gear it is 37.3 to 1; and in low gear it is 68.7 to 1.

In describing the transmission various identifying terms, such as input shaft, clutch shaft, brake shaft, hollow shaft, and output shaft, have been used. These terms have been used as a convenient means for differentiating one shaft from another, but are not to be construed as terms of limitation.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A power transmission unit comprising a housing, an input shaft extending through said housing and projecting from opposite ends thereof, a hollow shaft surrounding said input shaft for a portion of its length within said housing, selectively operable forward and reverse driving mechanism operatively disposed within said housing and between said shafts whereby said hollow shaft may be driven in the same or in the opposite direction with respect to said input shaft, a clutch shaft having a pair of gears journaled thereon, gearing drivingly connecting said gears with said hollow shaft for driving said gears at different relative speeds from said hollow shaft, each of said gears being provided with a toothed clutch member, a clutch slidably splined to said clutch shaft and selectively engageab'e with said clutch members for selectively coupling the same with said clutch shaft whereby said clutch shaft may be selectively driven from either of said gears, an output shaft geared to said clutch shaft for rotation therewith, said clutch shaft projecting from said transmission housing, and a brake including a drum mounted on the projecting end of said clutch shaft.

2. A power transmission unit comprising a housing, an input shaft extending through said housing and projecting from opposite ends thereof, a hollow shaft surrounding said input shaft for a portion of its length within said housing, selectively operable forward and reverse planetary gear driving mechanism operatively disposed within said housing and between said shafts whereby said hollow shaft may be driven in the same or in the opposite direction with respect to said input shaft, a clutch shaft having a pair of gears journaled thereon, gearing drivingly connecting said gears with said hollow shaft for driving said gears at different relative speeds from said hollow shaft, clutches for selectively coupling each of said gears with said clutch shaft whereby said clutch shaft may be selectively driven from either of said gears, an output shaft geared to said clutch shaft for rotation therewith, said clutch shaft projecting from said transmission housing, and a brake including a drum mounted on the projecting end of said clutch shaft, said input and output shafts being disposed parallel to each other.

3. A power transmission comprising an input shaft, a shaft arranged to be driven from said input shaft, selectively operable forward and reverse driving mechanism operatively disposed between said shafts whereby said driven shaft may be driven in the same or in the opposite direction with respect to said input shaft, a shaft having a pair of gears journaled thereon, gearing drivingly connecting said gears with said driven shaft for driving said gears at different relative speeds, selectively engageable clutches for selectively coupling said gears with said shaft on which said gears are journaled whereby said shaft may be selectively driven from either of said gears, and an output shaft geared to said last-mentioned shaft for rotation therewith, said shafts being disposed in parallel relation to each other.

4. A power transmission comprising an input shaft, a shaft arranged to be driven from said input shaft, selectively operable forward and reverse planetary gear driving mechanism operatively disposed between said shafts whereby said driven shaft may be driven in the same or in the opposite direction with respect to said input shaft, a shaft having a pair of gears journaled thereon, gearing drivingly connecting said gears with said driven shaft for driving said gears at different relative speeds, selectively engageable clutches for selectively coupling said gears with said shaft on which said gears are journaled whereby said shaft may be selectively driven from either of said gears, and an output shaft geared to said last-mentioned shaft for rotation therewith, said shafts being disposed in parallel relation to each other.

5. A power transmission comprising an input shaft, a shaft arranged to be driven from said input shaft, selectively operable forward and reverse driving mechanism operatively disposed between said shafts whereby said driven shaft may be driven in the same or in the opposite direction with respect to said input shaft, a clutch shaft having a pair of gears journaled thereon, said gears forming a part of a selectively operable change speed gearing drivingly connecting said clutch shaft with said driven shaft for driving said clutch shaft at different relative speeds, a brake mounted on said clutch shaft, and an output shaft geared to said clutch shaft for rotation therewith, said shafts being disposed in parallel relation to each other, said forward and reverse driving mechanism including a planetary gear mechanism, and a disc clutch and a brake associated therewith for controlling said planetary gear mechanism so as to selectively provide forward and reverse drive between said input and driven shafts.

6. A power transmission comprising an input shaft, a hollow shaft on said input shaft, selectively operable forward and reverse driving mechanism operatively disposed between said shafts whereby said hollow shaft may be driven in the same or in the opposite direction with respect to said input shaft, a clutch shaft having a pair of gears journaled thereon, said gears forming a part of a selectively operable change speed gearing drivingly connecting said clutch shaft with said hollow shaft for driving said clutch shaft at different relative speeds, a brake mounted on said clutch shaft, and an output shaft geared to said clutch shaft for rotation therewith, said shafts being disposed in parallel relation to each other, said forward and reverse driving mechanism including a planetary gear mechanism, and a disc clutch and a brake for controlling said planetary gear mechanism so as to selectively provide forward and reverse drives between said input and hollow shafts.

7. A power transmission for a cement mixer comprising an input shaft, a hollow shaft driven from said input shaft, selectively operable forward and reverse driving mechanism operatively disposed between said shafts whereby said hollow shaft may be driven in the same or in the opposite direction with respect to said input shaft, a clutch shaft, change speed gearing including a pair of gears journaled on said clutch shaft drivingly connecting said clutch shaft with said hollow shaft for driving said clutch shaft at different relative speeds, an output shaft geared to said clutch shaft for rotation therewith, said shafts being arranged parallel to each other, said forward and reverse driving mechanism including a planetary gear mechanism, and a disc clutch and a brake associated therewith for controlling said planetary gear mechanism so as to selectively provide forward and reverse drives between said input and driven shafts.

References Cited in the file of this patent

UNITED STATES PATENTS

| | | |
|---|---|---|
| 1,890,973 | Drexler et al. | Dec. 13, 1932 |
| 2,723,569 | Ferguson et al. | Nov. 15, 1955 |
| 2,747,416 | Swenson et al. | May 29, 1956 |
| 2,793,533 | Swenson et al. | May 28, 1957 |
| 2,838,940 | Swenson et al. | June 17, 1958 |
| 2,975,656 | Haverlender | Mar. 21, 1961 |
| 2,982,153 | Albertson et al. | May 2, 1961 |
| 3,040,58 | Hausmann et al. | June 26, 1962 |

UNITED STATES PATENT OFFICE
CERTIFICATE OF CORRECTION

Patent No. 3,077,116                                    February 12, 1963

Chris Gerst

It is hereby certified that error appears in the above numbered patent requiring correction and that the said Letters Patent should read as corrected below.

Column 3, line 54, for "to" read -- be --; column 5, line 31, for "by" read -- for --.

Signed and sealed this 3rd day of September 1963.

(SEAL)
Attest:

ERNEST W. SWIDER
Attesting Officer

DAVID L. LADD
Commissioner of Patents